United States Patent [19]

Otaki et al.

[11] Patent Number: 4,561,724
[45] Date of Patent: Dec. 31, 1985

[54] LIQUID CRYSTAL DISPLAY CELL WITH IMPROVED PLASTIC SUBSTRATES

[75] Inventors: Toshihiro Otaki; Ryuichi Nagata; Toshiya Yoshii, all of Ohtsu, Japan

[73] Assignee: Toray Industries, Inc., Tokyo, Japan

[21] Appl. No.: 554,030

[22] Filed: Nov. 21, 1983

[30] Foreign Application Priority Data

Nov. 25, 1982 [JP] Japan .................. 57-206407

[51] Int. Cl.$^4$ ............................... G02F 1/13
[52] U.S. Cl. .................... 350/334; 350/320; 350/339 R
[58] Field of Search ............. 350/334, 339 R, 320

[56] References Cited

FOREIGN PATENT DOCUMENTS

| 55-53318 | 4/1980 | Japan | 350/339 R |
|---|---|---|---|
| 5088024 | 7/1980 | Japan | 350/334 |
| 57-172319 | 10/1982 | Japan | 350/334 |
| 58-85416 | 5/1983 | Japan | 350/334 |

OTHER PUBLICATIONS

*Polythene*, A. Renfrew & P. Morgan ed., Iliffe and Sons Ltd., London, 1960, pp. 520–526.
*Plastic Films*, 2nd ed., J. H. Briston ed., Longman Group Ltd., Essex 1983, pp. 71–72.
S. Y. Hobbs, *Materials Technology*, Spring 1981, p. 4.
Levi, L., *Applied Optics*, vol. 2, pp. 918–921, (John Wiley & Sons 1980).

Primary Examiner—John K. Corbin
Assistant Examiner—Richard F. Gallivan
Attorney, Agent, or Firm—Armstrong, Nikaido, Marmelstein & Kubovcik

[57] ABSTRACT

A liquid crystal display cell comprising a pair of facing plastic films, a pair of transparent electrodes, each said electrode being formed on the facing surfaces of the films, a liquid crystal enclosed between the films, and a pair of polarizing films, each being provided on the opposite surface of the plastic film, the plastic film comprising a polyester film having a density of 1.380~1.420 g/cm$^3$ and three-way refractive indexes within the following range:

$$-0.03 \leq (n_1 + n_3)/2 - n_2 \leq +0.05,$$

and $$1.480 \leq n_3 > 1.525$$

wherein
$n_1$ = refractive index in the principal oriented direction;
$n_2$ = refractive index in the direction intersecting perpendicularly to $n_1$ and $n_3$; and
$n_3$ = refractive index in the direction of film thickness.

The liquid crystal display cell thus constructed according to the present invention offers excellent flexibility and a nice display with clarity and lightness. Additionally, the present cell is particularly suitable for thin electronic calculators and liquid crystal televisions with a large and/or curved display area.

24 Claims, 1 Drawing Figure

LIQUID CRYSTAL DISPLAY CELL WITH IMPROVED PLASTIC SUBSTRATES

BACKGROUND OF THE INVENTION (1) Field of the Invention

This invention relates to a liquid crystal display cell, and more particularly to a liquid crystal display cell with excellent flexibility and offering a nice display with clarity and lightness.

(2) Description of the Prior Art

Heretofore, transparent sheets for liquid crystal cells have been made of glass. However, since glass is not flexible, the disadvantage of such transparent sheets is that they are easily broken if curved. For this reason, it has been impossible to prepare large-sized and/or curved display. In order to overcome this disadvantage, there was proposed a technique in the Japanese patent application laying-open publication No. 35325/1980, according to which a biaxial oriented polyester film was employed instead of glass. Nevertheless, colored stripes caused by the interference of light on the display, if obliquely looked at, make unavailable a clear displayed pattern. As for a large-sized and/or curved liquid crystal display cell, the viewer is to watch the edge of the display in the oblique direction necessarily and the disadvantage is that, because of colored stripes on the edge, such a large-sized and/or curved cell cannot be prepared. Furthermore, there was proposed another technique in the Japanese patent application laying-open publication No. 173816/1982 according to which a uniaxial oriented polyester film was used to eliminate these disadvantages. However, such a transparent film is still not free from disadvantages in that the inferior heat-resistance of the film causes the cell to deform and that a clear display is unavailable because the transparency of the film is low. In other words, there has not been known a liquid crystal display cell as disclosed according to the present invention with excellent flexibility and offering a nice display with clarity and lightness.

SUMMARY OF THE INVENTION

An object of the present invention is to provide a liquid crystal display cell with excellent flexibility and offering a nice display with clarity and lightness.

Another object of the present invention is to provide a large-sized and/or curved liquid crystal display cell.

In brief, the present invention relates to a liquid crystal display cell comprising a pair of facing plastic films, a pair of transparent electrodes, each said electrode being formed on the facing surfaces of the films, a liquid crystal enclosed between the films, and a pair of polarizing films, each being provided on the opposite surface of the plastic film, whereby the plastic film is a polyester film having a density of $1.389 \sim 1.420$ g/cm$^3$ and three-way refractive indexes within the following ranges:

$$-0.03 \leq (n_1+n_3)/2 - n_2 \leq +0.05, \text{ and}$$

$$1.480 \leq n_3 \leq 1.525$$

wherein $n_1$ = refractive index in the principal oriented direction;

$n_2$ = refractive index in the direction intersecting perpendicularly to $n_1$ and $n_3$; and $n_3$ = refractive index in the direction of film thickness.

The principal oriented direction is such that the refractive index is maximized within the film plane.

DESCRIPTION OF THE PREFERRED EMBODIMENTS

Figure 1:
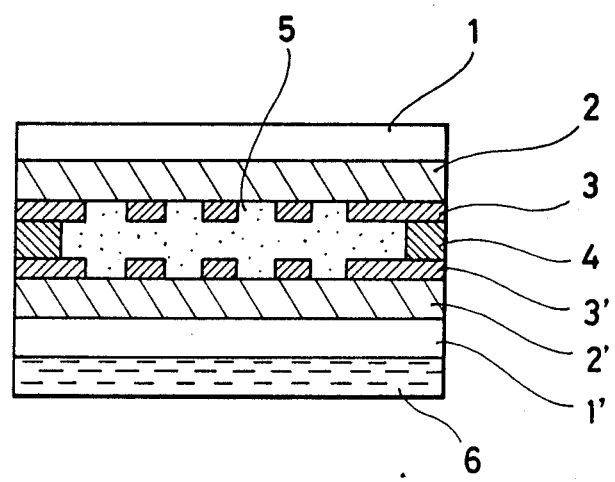
FIG. 1 is a schematic sectional view of a liquid crystal display cell in accordance with the present invention.

The polyester film in accordance with the present invention is one which is composed of 85 mole % or more of polyethylene terephthalate, preferably 95 mole % or more of it, and most preferably a polyethylene terephthalate homopolymer, the polyester film being uniaxially or biaxially oriented.

The value N of the following equation obtained from the three-way refractive indexes of the film must be within the range of $-0.03 \sim +0.05$:

$$(n_1+n_3)/2 - n_2 = N$$

where $n_1$ = refractive index in the principal oriented direction; $n_2$ = refractive index in the direction intersecting perpendicularly to $n_1$ and $n_3$; and $n_3$ = refractive index in the direction of thickness, the principal oriented direction being such that the refractive index is maximized within the film plane.

N being less than $-0.03$ is not preferred because intense colored stripes appear on the displayed surface of the liquid crystal display cell. On the other hand, N being more than $+0.05$ is also not preferred because the film is subjected to fibrillation and readily torn and broken when it is curved. The preferred range of N is within $-0.01 \sim +0.04$ and the most preferred range thereof is within $0 \sim +0.03$.

Moreover, $n_3$, the refractive index in the direction of film thickness, must be within the range of $1.480 \sim 1.525$; $n_3$ being less than 1.480 is not preferred because intense colored stripes appear on the display of the liquid crystal display cell. $n_3$ being greater than 1.525 is also not preferred because the transparency of the film becomes low with the result that the display is lacking in lightness. The preferred range of $n_3$ is within $1.483 \sim 1.520$, whereas the most preferred range thereof is within $1.486 \sim 1.515$.

In addition, the film density must be within the range of $1.380 \sim 1.420$ g/cm$^3$. Any film whose density is less than the above range shows poorer heat-resistance, so that the liquid crystal display cell exposed to high temperatures is readily deformed. On the other hand, a film whose density is greater than the above range offers inferior transparency resulting in the lack of clarity and lightness. A preferred density of the film ranges $1.385 \sim 1.410$ g/cm$^3$. The polyester film employed in accordance with the present invention should have more than 75%, preferably 80% of the transmission rate of visible light, which makes the display clear and the displayed pattern readily distinguishable. Moreover, it is desirable that the number of greater fish eyes (size: non-homogeneous portions having a length of 100 μm or over in the major axis) in the film is less than 50 pieces/1,000 cm$^2$, preferably less than 20 pieces/1,000 cm$^2$, because a lot of large fish eyes which give the display star-like defects can be eliminated. The thickness of the film should be $10 \sim 250$ μm, preferably $20 \sim 180$ μm and most preferably $30 \sim 120$ μm because the film should be stiff enough and free from shade defect on the display caused by thickness of the film.

It is also desirous to embody the present invention in a large-sized display cell with a longest side or the major axis of the film per cell being more than 5 cm, preferably more than 10 cm as the cell can particularly demonstrate the intended effects. Moreover, the film allowed to have a curved surface by bending it in a curvature radius of less than 200 cm may be formed into a superior liquid crystal display cell. The curved surface permits the viewer to look at the displayed pattern from different angles and the liquid crystal display cell and be inserted in a narrow curved space. The preferred range of the curvature radius is 100 cm or less and the further preferred range thereof is 50 cm or less.

The film may contain inert inorganic particles, an ultraviolet ray absorbent, dye, pigment, an antistatic agent, etc. within a range not interfering the object of the present invention.

Now, the production of the polyester film in accordance with the present invention will be described. The method of manufacturing the polyester film comprises the steps of melting and extruding polyester to prepare a non-oriented film, drawing the film and heat-setting it. The film should preferably be stretched with a draw ratio of 3.1~5.5 in the longitudinal direction or transverse direction. This stretching is called principal stretching. With the draw ratio of 3.0 or less, $n_3$ of the film will increase to more than 1.525 or more with its transparency being deteriorated, whereas the film will become fragile with the draw ratio of 5.6 or more, which is not preferred. In addition to such stretching, the film may be drawn in the other direction with the draw ratio of 2.0 or less. If the film is drawn with a draw ratio exceeding the above value, the aforementioned N of the film will become less than −0.03 which is not acceptable. The order of the draws at the draw ratios 3.1~5.5 and 2.0 or less may be changed. The drawing temperature could preferably be within the range of 80°~110° C., though it is not restricted to that range in particular. The heat-setting temperature could preferably be within the range of 160°~240° C. If the temperature is lower than 160° C., the film density will become less than 1.380 g/cm$^3$, whereas the fibrillation of the film will be promoted and the film will become fragile if the temperature is higher than 240° C. The more preferred heat-setting temperature is within the ranges of 190°~230° C. It is important that the dimensional variation of the film during heat-setting should be kept between −10 and +10% based on the original length measured in the direction perpendicular to the principal stretching direction. In other words both relaxation and stretching during heat-setting should be kept between 0 and 10%. If the dimensional variation caused is less than −10%, e.g., −20%, the film will become fragile because of fibrillation and, on the other hand, if it is more than +10%, N of the film will exceed +0.05; consequently, neither case is desirable. A more preferred range of the film dimensional variation is within −5~+5% and the most preferred range thereof is within −2~+2%.

Referring now to the drawing, one exemplary embodiment of the present invention in the form of a liquid crystal display cell will be described. However, the present invention is not limited to such an embodiment.

FIG. 1 is a schematic sectional view of a liquid crystal display cell in accordance with the present invention comprising polyester films 2, 2′, patterned transparent electrodes 3, 3′, a frame sealant 4, liquid crystal 5, and a reflector or scattering sheet 6. As shown in the drawing, the transparent electrodes 3, 3′ are provided on the opposed surfaces of the polyester films 2, 2′. Concerning the transparent electrode, any known transparent one used generally in a liquid crystal display cell is usable. One can use for the present invention, for instance, an indium oxide and/or tin oxide evaporated or sputtered, for the transparent electrode with a transmission ratio of visible light of 70~90% and a resistivity of 10~1,000 Ω/cm$^2$. One or both of the transparent electrodes 3, 3′ may be provided with a literal or graphical pattern formed by the etching method. The liquid crystal 5 is enclosed in between these two sheets of films 2, 2′ with the frame sealant 4. Although a twisted nematic mode is preferred as the mode of the liquid crystal display, a guest host mode or a dynamic scattering mode may be also employed. Any known liquid crystal may be used for the liquid crystal display cell and, for instance, one having the following structure may be named a representative example:

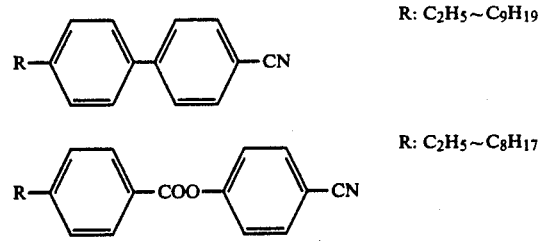

Polarizing films 1, 1′ are also not limited to a particular kind and any one of known polarizing films used for the liquid crystal display cell, for instance, a uniaxially oriented polyvinyl alcohol film, to which an iodine dyestuff and/or dichroism dyestuff has been added, may be provided on each non-opposed surface of the polyester film 2, 2′. It is preferred to combine the polarizing films 1, 1′ with the polyester film 2, 2′ in such a manner that their polarizing axes are parallel with or at a right angle to the principal oriented direction of the polyester films 2, 2′. Polarizing axes of the polarizing films 1, 1′ are normally parallel with or at a right angle to each other. A prelaminated combination of polyester and polarizing films may be used. On the outside of one of the polarizing films is normally provided the reflector or scattering sheet 6.

The liquid crystal display cell in the present invention can effectively be employed in clocks, electronic calculators, toys with displays, instrument panels of automobiles, displays for terminal units of computers, etc.

As above described, the liquid crystal display cell thus constructed according to the present invention uses a polyester film whose three-way refractive indexes are given by the aforementioned equation. The interference due to birefringence is minimized when light reflected from the reflector or scattering sheet 6 passes through the polarizing film 1′, polyester film 2′, liquid crystal 5, furthermore upper polyester film 2, and polarizing film 1. Accordingly, no colored stripes appear when the display is viewed from any direction. Furthermore, the displayed pattern and background are clear and light enough. Therefore, the present liquid crystal display cell is particularly suitable for a large-sized or curved display cell, because no colored stripes appear even when the display is viewed from the oblique angle.

Following description relates to the methods of measuring and evaluating the characteristics noted in the present invention.

(1) REFRACTIVE INDEX

According to the ASTM-D542-50, measurement was made by an Abbe's refractometer. The sodium lamp (wavelength: 589 nm) were used as a light source. Methylene iodide (refractive index: 1.7425) was used as a contacting liquid.

(2) DENSITY

According to the ASTM-D1505-68, measurement was made by density gradient pipes. N-heptane (density: 0.6386 g/cm$^3$) and carbon tetrachloride (density: 1.5924 g/cm$^3$) were employed as light and heavy liquids, respectively.

(3) TRANSMISSION RATE OF VISIBLE LIGHT

Measurement was made according to the ASTM-D1003-61.

(4) FISH EYES

A polarizing microscope was used to measure the major axes and the number of those exceeding 100 μm was counted.

(5) COLORED STRIPES ON THE DISPLAY

By using two sheets of polyester films coated with transparent electrodes, twisted nematic liquid crystal, two sheets of polarizing films, and a reflector, a liquid crystal display cell having a displayed area of 1.5 cm × 6 cm was prepared. Then the displayed pattern on the display was observed with the naked eye under white light from the front and at a viewing angle of 10° to make decision:

Criteria:
Excellent: When viewed from the front and at an angle, no colored stripes are observed;
Good: When viewed from the front, no colored stripes are observed and, when viewed at an angle, colored stripes are slightly observed but there is practically no problems;
Fair: When viewed from the front, no colored stripes are observed and, when viewed at an angle, traces of colored stripes are observed but there is practically no problem;
Poor: When viewed from the front and at an angle, thick colored stripes are observed.

(6) LIGHTNESS OF THE DISPLAY

The same liquid crystal display cell as employed for the evaluation of colored stripes was used to judge whether the displayed background is light or dark.
Criteria:
Good: Background is light enough;
Poor: Background is dark and the boundary between background and displayed pattern is unclear.

(7) FLEXIBILITY

By bending the liquid crystal display cell with hand, breakage was examined.
Criteria:
Good: Not broken;
Poor: Easily broken.

Examples 1~4:

Polyethylene terephthalate melted at 280° C. was extruded from a die onto a drum cooled at lower than 70° C. so that it was solidified. This film, practically not oriented, was drawn longitudinally and transversely at 90° C. according to the draw ratios shown in Table 1, followed by heat set at 210° C. for 10 seconds. Dimensional variation during heat set was 0% in any direction, i.e., no relaxation and no stretching were given during heat set.

The properties of each film thus prepared are shown in Table 1. The liquid crystal display cell shown in FIG. 1 was assembled using each of the films.

No colored stripes appeared on the display of the liquid crystal display cell and a clear displayed pattern was obtained when the transparent electrodes were charged with electricity.

COMPARATIVE EXAMPLES 1~3

A liquid crystal display cell was assembled in the same way as in the Example 1, using films indicating draw ratios and properties shown in Table 1.

The display of comparative Examples 1 and 2 wore thick colored stripes. Moreover, when the cell of the Comparative Example 3 was curved, it was readily broken. Each of cells of Comparative Examples proved unsuitable for practical use.

COMPARATIVE EXAMPLE 4

The unoriented polyethylene terephthalate film had a density of 1.3354 g/cm$^3$, N being 0.000 and n$_3$ being 1.5760 g/cm$^3$. A liquid crystal display cell was assembled in the same way as in Example 1, using the above films.

When this display cell was heated at 80° C., it lost stiffness followed by deformation and, when cooled to the normal temperature, it was not restored to the original shape.

COMPARATIVE EXAMPLE 5

A liquid crystal display cell was assembled under the same conditions as in Example 2 except that the longitudinal draw ratio was set at 3.0, heat-setting, at 200° C. for 10 minutes and thickness, 100 μm. The properties of the film are shown in Table 1. Since the transparency of the film was deteriorated because n$_3$ became greater than 1.525, the display was dark and unsatisfactory.

COMPARATIVE EXAMPLE 6

A liquid crystal display cell was assembled under the same conditions as in Example 2, providing −20% of the dimensional variation in the film during heat-setting. The properties of the film are shown in Table 1. Since N became greater than +0.05, the flexibility of the liquid crystal display cell became decreased.

TABLE 1

| | Film | | | | | | | | Liquid crystal display cell | | |
|---|---|---|---|---|---|---|---|---|---|---|---|
| | Draw Ratio (Times) | | Thickness (μm) | Density (g/cm³) | Refractive index | | | N | Colored stripe on display | Lightness of the display | Flexibility |
| | Longitudinal | Transverse | | | $n_1$ | $n_2$ | $n_3$ | | | | |
| Example 1 | 1.0 | 4.0 | 90 | 1.3891 | 1.702 | 1.584 | 1.494 | +0.014 | Excellent | Good | Good |
| Example 2 | 3.7 | 1.0 | 50 | 1.3882 | 1.700 | 1.592 | 1.500 | +0.008 | Excellent | Good | Good |
| Example 3 | 4.0 | 1.5 | 100 | 1.3900 | 1.704 | 1.604 | 1.486 | −0.009 | Good | Good | Good |
| Example 4 | 2.0 | 4.1 | 125 | 1.3902 | 1.690 | 1.615 | 1.496 | −0.022 | Fair | Good | Good |
| Comparative Example 1 | 2.6 | 4.1 | 100 | 1.3926 | 1.694 | 1.626 | 1.492 | −0.033 | Poor | Good | Good |
| Comparative Example 2 | 3.4 | 3.4 | 100 | 1.3951 | 1.654 | 1.652 | 1.482 | −0.085 | Poor | Good | Good |
| Comparative Example 3 | 5.6 | 1.0 | 80 | 1.3932 | 1.708 | 1.560 | 1.520 | +0.054 | Excellent | Good | Poor |
| Comparative Example 5 | 3.0 | 1.0 | 100 | 1.3940 | 1.693 | 1.589 | 1.527 | +0.023 | Excellent | Poor | Good |
| Comparative Example 6 | 3.7 | 1.0 | 50 | 1.3901 | 1.708 | 1.560 | 1.522 | +0.055 | Excellent | Good | Poor |

EXAMPLE 5

A liquid crystal display cell was assembled under the same conditions as in Example 2, providing the use of films with a density of 1.3882 g/cm³, N=+0.008, $n_3$=1.500, the transmission rate of visible light at 85%, the number of fish eyes being 15 pieces/1,000 cm², and thickness of 80 μm. The displayed surface was light and clear, and free from star-like defect. When the transparent electrodes were charged with electricity, a clear displayed pattern was obtained without any shade defect.

EXAMPLE 6

A liquid crystal display cell having a convex displayed surface of 5 cm × 10 cm in size with a curvature radius of 50 cm was assembled as in the case of Example 2, using films with a density of 1.3882 g/cm³, N= +0.008, $n_3$=1.500, and thickness of 90 μm.

The display showed no colored stripes when viewed from any direction. A light and clear displayed pattern was obtained when the transparent electrodes were charged with electricity.

What is claimed is:

1. A liquid crystal display cell comprising a pair of facing plastic films, a pair of transparent electrodes, each said electrode being formed on the facing surfaces of said films, a liquid crystal enclosed between said films, and a pair of polarizing films, each being provided on the opposite surface of said plastic film, said plastic film comprising a polyester film containing at least 95 mole percent of polyethylene terephthalate, said film having a density of 1.380–1.420 g/cm³ and three-way refractive indexes within the following range:

$$-0.03 \leq (n_1+n_3)/2 - n_2 \leq +0.05, \text{ and}$$
$$1.480 \leq n_3 \leq 1.525$$

wherein
$n_1$ = refractive index in the principal oriented direction;
$n_2$ = refractive index in the direction intersecting perpendicularly to $n_1$ and $n_3$; and
$n_3$ = refractive index in the direction of film thickness.

2. A liquid crystal display cell as claimed in claim 1, wherein the three-way refractive indexes of said polyester film are within the range of:

$$-0.01 \leq (n_1+n_3)/2 - n_2 \leq +0.04.$$

3. A liquid crystal display cell as claimed in claim 1, wherein the three-way refractive indexes of said polyester film are within the range of:

$$0.00 \leq (n_1+n_3)/2 - n_2 \leq +0.03.$$

4. A liquid crystal display cell as claimed in claim 1, wherein $n_3$ is within the range of 1.483~1.520.

5. A liquid crystal display cell as claimed in claim 1, wherein $n_3$ is within the range of 1.486~1.515.

6. A liquid crystal display cell as claimed in claim 1, wherein said polyester film is composed of polyethylene terephthalate homopolymer.

7. A liquid crystal display cell as claimed in claim 1, wherein the density of said plastic film is within the range of 1.385~1.410 g/cm³.

8. A liquid crystal display cell as claimed in claim 1, wherein said polyester film is a film having a drawing ratio of 3.1~5.5 in one direction.

9. A liquid crystal display cell as claimed in claim 8, wherein said polyester film is a film being heat-set at 160°~240° C.

10. A liquid crystal display cell as claimed in claim 9, wherein said polyester film is a film being heat-set under tension within the range of −10~+10% of dimensional variation.

11. A liquid crystal display cell as claimed in claim 9, wherein said polyester film is a film being heat-set under tension within the range of −5~+5% of dimensional variation.

12. A liquid crystal display cell as claimed in claim 9, wherein said polyester film is a film being heat-set under tension within the range of −2~+2% of dimensional variation.

13. A liquid crystal display cell as claimed in claim 1, wherein said polyester film is a film having a transmission rate of visible light of more than 75%.

14. A liquid crystal display cell as claimed in claim 1, wherein said polyester film is a film having a transmission rate of visible light of more than 80%.

15. A liquid crystal display cell as claimed in claim 1, wherein said polyester film is a film having fewer than 50 fish eyes exceeding 100 μm in length per 1,000 cm³, as determined using a polarizing microscope.

16. A liquid crystal display cell as claimed in claim 1, wherein said polyester film is a film having fewer than 20 fish eyes exceeding 100 μm in length per 1,000 cm³, as determined using a polarizing microscope.

17. A liquid crystal display cell as claimed in claim 1, wherein said polyester film is a film having a thickness of 10~250 μm.

18. A liquid crystal display cell as claimed in claim 1, wherein said polyester film is a film having a thickness of 20~180 μm.

19. A liquid crystal display cell as claimed in claim 1, wherein said polyester film is a film having a thickness of 30~120 μm.

20. A liquid crystal display cell as claimed in claim 1, wherein said polyester film is a film having size of at least 5 cm in its longest direction.

21. A liquid crystal display cell as claimed in claim 1, wherein said polyester film is a film having size of at least 10 cm in its longest direction.

22. A liquid crystal display cell as claimed in claim 1, wherein said polyester film is composed of a pair of plastic films curved at a curvature radius of less than 200 cm.

23. A liquid crystal display cell as claimed in claim 1, wherein said polyester film is composed of a pair of plastic films curved at a curvature radius of less than 100 cm.

24. A liquid crystal display cell as claimed in claim 1, wherein said polyester film is composed of a pair of plastic films curved at a curvature radius of less than 50 cm.

* * * * *